Feb. 22, 1966   A. M. COHEN   3,236,968
TIME DELAY RELAY
Filed Feb. 18, 1964   2 Sheets-Sheet 1
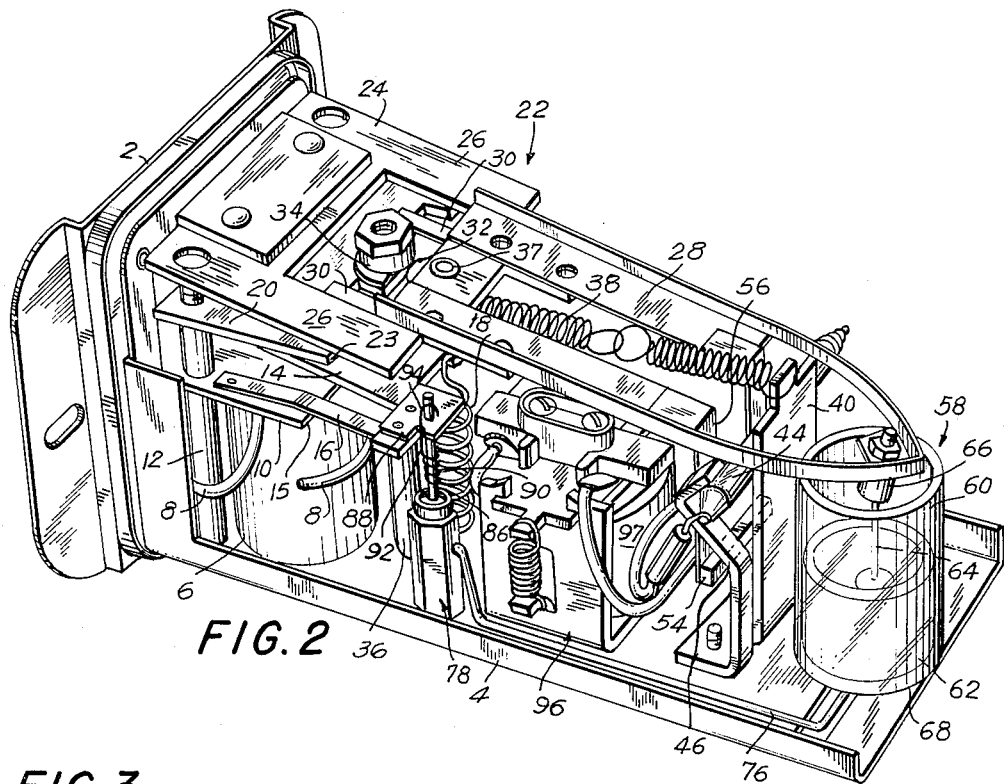
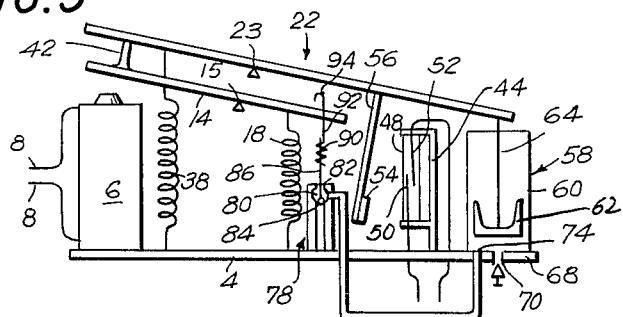
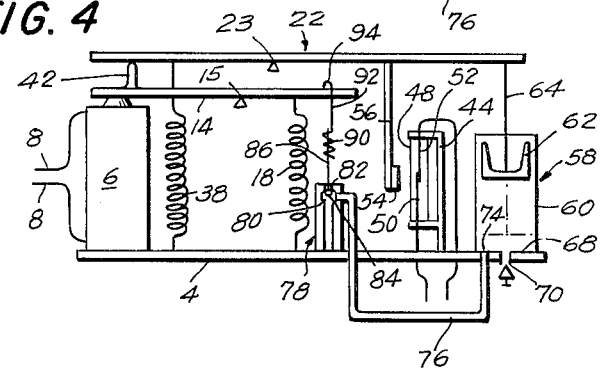
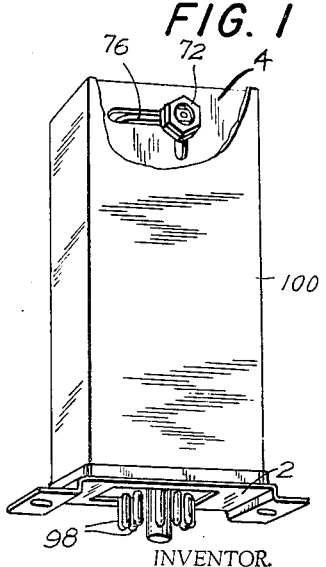
INVENTOR.
ARTHUR M. COHEN
BY
James and Franklin
ATTORNEYS INVENTOR.
ARTHUR M. COHEN
BY
*James and Franklin*
ATTORNEYS United States Patent Office 3,236,968
Patented Feb. 22, 1966

3,236,968
TIME DELAY RELAY
Arthur M. Cohen, Westport, Conn.
Filed Feb. 18, 1964, Ser. No. 345,742
20 Claims. (Cl. 200—97)

The present invention relates to a construction of a time delay relay.

There are many instances where the condition of an electrical circuit is to be modified a predetermined period of time after the appearance or disappearance of a given signal. Many constructions have been disclosed in the past for accomplishing this result, but these prior art arrangements have left much to be desired insofar as timing accuracy over an appreciable adjustable timing range is concerned. In many instances the timing will vary with the magnitude of the actuating signal, an undesirable situation. Sensitivity to temperature and vibration, excessive reset time between actuations, and close limits as to the amount of power which can be controlled, are other sources of trouble. Versatility and adaptability, if achieved at all, are accompanied by complexity and lack of dependability. Electric circuitry can provide the requisite time measurement, but the use of electrical components for that purpose constitutes a source of trouble insofar as calibration, maintenance and reliability are concerned, and as a practical matter electrical timing circuits can only provide a very limited range of adjustability. Mechanical timing arrangements are either insufficiently accurate, too expensive, or unduly complex, trouble-prone, and temperature sensitive.

The primary object of the present invention is to devise a time delay relay which is essentially mechanical in nature insofar as the timing function is concerned, which can be adjusted to accurately measure time intervals over an appreciable range, which will accurately perform its desired functions under unfavorable environmental conditions, and which will have a reliability factor much higher than had previously been thought possible in comparable devices.

To these ends the timing is performed by a movable timing arm provided with accurately adjustable damping. The arm is normally maintained in a first operative position by means of a control mechanism. When the control mechanism is rendered inoperative the arm is released and permitted to move in a damped manner to its second operative position, the amount of damping controlling the time involved in such movement. The control mechanism is adapted to be rendered operative or inoperative by the actuating signal. Two embodiments are disclosed, in one of which the control mechanism is operative until a signal is received and in the other of which the control mechanism is operative for so long as a signal is received. Since the signal acts only on the control mechanism and not on the timing arm itself, the magnitude of that signal, provided that it is sufficient to actuate or deactuate the control mechanism, plays no part in the timing operation.

The timing arm carries a magnet which is moved by the arm toward and away from a magnetically sensitive switch, the position of the magnet relative to the switch controlling the circuit condition of that switch. Hence as the timing arm moves between its first and second operative positions the magnet connected thereto moves toward and away from the magnetically sensitive switch and turns that switch on and off. The switch can itself control the external circuitry in question, but ordinarily such magnetically sensitive switches, if they are to be sufficiently accurate, must be of low power handling capacity. Accordingly, in the preferred embodiment here disclosed, the magnetically sensitive switch controls a relay of appreciable power-handling capacity, which in turn controls the external circuitry.

Means are provided for removing the damping from the timing arm when the relay is to reset, thus greatly reducing the time required for such resetting.

The structural arrangement is such that the device is quite temperature-insensitive, and is also highly resistant to shock or vibration.

Devices made in accordance with the present invention provide a timing accuracy of better than 5% over a timing range between 0.2 second and 30 minutes, while requiring only approximately one-quarter second or less for reset regardless of the timing adjustment. It is accurate over a temperature range between —65° F. and 170° F. yet takes up a space 2″ x 2″ x 4½″. Its ruggedness and ability to withstand vibration is attested to by the fact that it has been used with a high degree of success in airborne equipment and on train locomotives, and its adaptability is attested to by the fact that it is also used in high precision instrumentation.

To the accomplishment of the above, and to such other objects as may hereinafter appear, the present invention relates to the construction of a time delay relay as defined in the appended claims and as described in this specification, taken together with the accompanying drawings in which:

FIG. 1 is a three-quarter perspective view, with the casing partially broken away, of a typical embodiment of the present invention;

FIG. 2 is a three-quarter perspective view, on an enlarged scale, of a first embodiment of the present invention designed to time an interval after a signal has been received;

FIG. 3 is a schematic view of the embodiment of FIG. 2, the parts being shown in the position which they assume before a signal has been received;

FIG. 4 is a view similar to FIG. 3 but showing the position of the parts after a signal has been received and the device has timed out;

Figure 5:
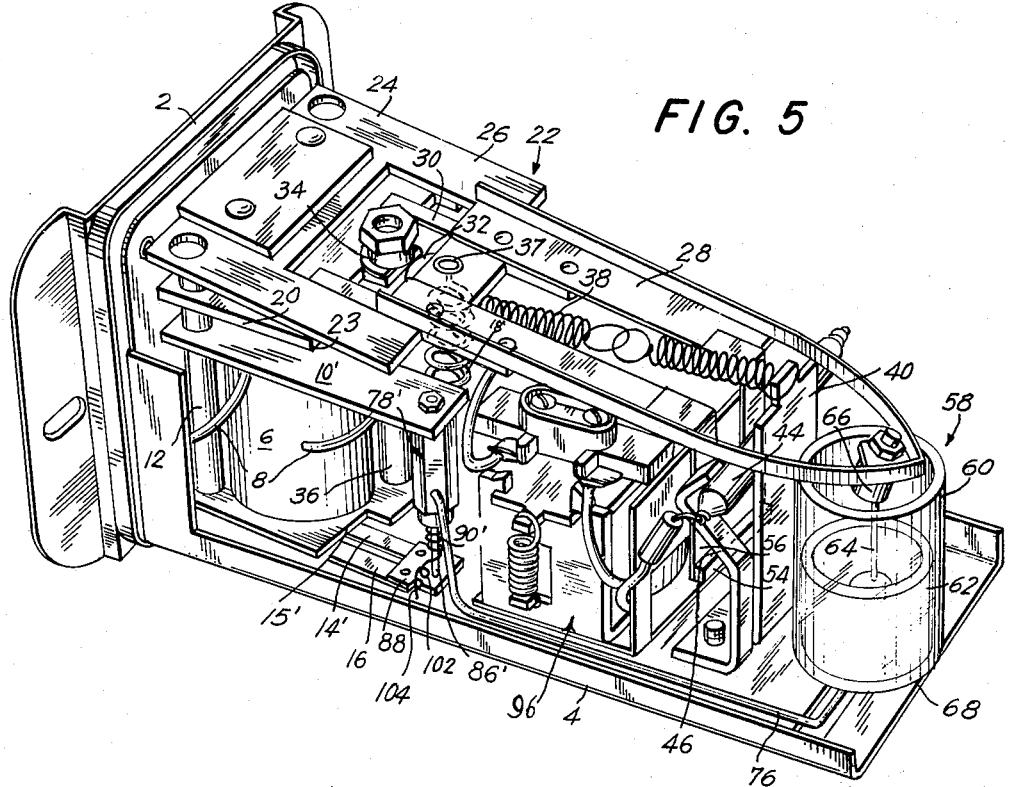
FIG. 5 is a view similar to FIG. 2, but showing an alternative embodiment designed to time an interval after a signal has ceased.

Turning first to the embodiment of FIGS. 2–4, which is designed to provide a time delay after energization, it comprises a base plate 2 from which a support bracket 4 extends. An electromagnet coil 6 is mounted on the support 4, and it is to this coil that the energizing signal is adapted to be transmitted via the leads 8. A fixed plate 10, mounted on posts 12, extends over the top of the coil 6, and a conrol arm 14 is pivotally mounted on an edge 15 of the plate 10 so that part thereof extends over the coil 6 and part thereof extends laterally beyond the coil 6. Flat leaf springs 16 are provided, one on each side of the control arm 14, for retaining it in position. That portion of the control arm 14 which extends over the coil 6 is adapted to be magnetically attracted thereto. A tension spring 18 is connected between the righ-hand end of the control arm 14 and the support 4, the spring 18 being effective to bias the arm 14 to rotate in a clockwise direction as viewed in FIG. 1. When the coil 6 is sufficiently energized a magnetic field will be produced the magnitube of which, when exerted on the portion of the control arm 14 overlying the coil 6, will be sufficient to overcome the biasing action of the spring 18 and cause the arm 14 to pivot in a counterclockwise direction as viewed in FIG. 3.

A plate 20 is carried by posts 12 above the plate 10, and the timing arm, generally designated 22, is pivotally mounted on the right-hand edge 23 of the plate 20. The arm 22 comprises a plate 24 having side arms 26 constituting the elements pivotally engaging the plate edge 23. A light weight bracket 28 is secured to the arms 26 and exends longitudinally therefrom. Flat leaf springs 30 are secured to the bracket 28 and to the plate 20, thereby retaining the timing arm 22 in position. A lip 32 extends to the left from the bracket 28 and engages beneath washer 34, which is in turn mounted on fixed post 36, thus limiting the upward position of the timing arm 22. A stud 37 depends from the bracket 28 at a point to the right of the fulcrum for the timing arm 22, and a spring 38 is connected between the lower end of that stud 37 and bracket 40. The spring 38 thus biases the timing arm 22 so as to pivot in a counterclockwise direction as viewed in FIG. 2. The control arm 14 has an upstanding pin 42 secured thereto (not visible in FIG. 2 but shown in FIGS. 3 and 4) which is adapted to engage the underside of the timing arm 22 at its left-hand end. In this embodiment the biasing force of the spring 18 on the control arm 14 is greater than the biasing force of the spring 38 on the timing arm 22, these two springs acting in opposite directions on their respective arms. Consequently, in the unenergized condition of the unit the parts will take the position shown in FIGS. 2 and 3, with the control arm 14 pivoted clockwise under the action of the spring 18, and with the projection 42 engaging the timing arm 22 and moving it to its clockwise position against the action of the spring 38.

Magnetically sensitive switch 44 is supported by fingers 46 in a raised position in front of the bracket 40. This switch, as may best be seen from FIGS. 3 and 4, comprises a magnetically transparent envelope 48 of plastic or glass, within which a pair of thin flexible spring contact arms 50 and 52 are mounted, those arms normally being spaced from one another so as to define an open circuit. The arm 52 is formed at least in part of magnetically attractable material. A permanent magnet 54 is located to the left of the switch 44 and is carried by bracket 56 dependent from the timing arm 22. Hence as the timing arm 22 pivots in a counterclockwise direction the magnet 54 will be moved closer to the switch 44, and when it is sufficiently close the magnetic attraction of the magnet 54 on the contact arm 52 will pull the later into engagement with the contact arm 50, closing the circuit through the switch 44.

A dashpot, generally designated 58, is mounted at the right-hand end of the support 4. It comprises a cylinder 60 with a piston 62 sealingly slidably received therein, rod 64 extending up from the piston 62 and being received in universal joint 66 carried by the right-hand end of the bracket 28. Thus the piston 62 will be moved toward and away from the bottom wall 68 of the cylinder 60 as the timing arm 22 pivots in clockwise and counterclockwise directions respectively. The bottom wall 68 of the cylinder 60 is provided with an adjustably throttled restricted opening 70, adjustment for which is accomplished by means of screw 72 accessible from the underside of the support plate 4 (see FIG. 1). The cylinder bottom wall 68 is further provided with a relatively unrestricted opening 74 which communicates by conduit 76 with the valve generally designated 78 mounted on the support plate 4 adjacent the right-hand end of the control arm 14. The interior of the valve 78 is schematically indicated in FIGS. 3 and 4. It comprises a chamber 80 to which the conduit 76 communicates, the upper end of that chamber having a seat 82 with which an internal ball 84 is adapted to sealingly cooperate. The ball 84 is fixed to rod 86 which extends up from valve 78. The control arm 14 carries a plate 88 having an opening through which the rod 86 extends, there preferably being a frictional engagement between the two. In addition, a wire 90 is coiled around the upwardly extending portion of the rod 86 so as to frictionally engage that rod, the wire having an extension 92 which frictionally engages the side edge of the plate 88 and which terminates at its upper end in a bent over portion 94.

While the switch 44 could itself control an external circuit, it is preferred, because of the minimal power-handling capacity of such switches, that it in turn control a more conventional relay generally designated 96, the latter in turn controlling the external electric circuitry for a given application.

Connection prongs 98 depend from the base plate 2, those prongs providing for external electrical connection to the actuating coil 6, the contacts of the relay 96, and the circuit defined by the switch 44 and the coil 97 of the relay 96. Thus the device is capable of plug-in use. A casing 100 may surround and seal the operating parts.

The operation of the relay is as follows: When no signal is received by the electromagnet coil 6, the parts assume the position shown in FIGS. 2 and 3, with the control arm 14 pivoted to its clockwise operative position, thereby causing the timing arm 22 to move to its clockwise operative position, the piston 62 of the dashpot 58 being lowered, the rod 86 of the valve 78 being in its lower position, exposing the conduit 76 to the atmosphere, and the magnet 54 being remote from the switch 44, that switch therefore assuming its normally open position deenergizing the coil 97 of the relay 96.

As soon as the coil 6 is energized by a signal sufficiently strong to produce a magnetic field capable of overcoming the action of a spring 18, the control arm 14 will be pivoted to its counterclockwise position shown in FIG. 4. (It should be noted that this will occur whether the signal is just strong enough to produce the desired result or is stronger than that minimal value.) This will move the projection 42 away from the left-hand end of the timing arm 22, and immediately the spring 38 will be rendered effective to cause the timing arm 22 to pivot in that counterclockwise direction. This movement will, however, be limited in speed by the dashpot 58. As soon as the control arm 14 starts to pivot in a counterclockwise direction it lifts the valve rod 86 by virtue of the frictional connection therebetween. This lifts the ball 84 into sealing engagement with the seat 82, blocking the conduit 76. Consequently air can enter the space between the bottom cylinder wall 68 and the piston 62 only through the throttled opening 70, and the setting of the throttling valve will therefore determine the resistance which the piston 2 will exert against being raised. Hence the setting of the throttling valve 70, in conjunction with the spring 38, will determine the time required for the timing arm 22 to move from its initial clockwise position shown in FIGS. 2 and 3 to its final counterclockwise position shown in FIG. 4. It is only when the timing arm 22 is pivoted a predetermined amount in a clockwise direction that the magnet 54 is brought close enough to the switch 44 to cause that switch to close, thus energizing the relay 96. It should be noted that the timing of the movement of the timing arm 22 is entirely independent of signal strength, and is controlled exclusively by the tension of the spring 38 and the setting of the throttling valve 70. When the control arm 14 is in its final counterclockwise position it will positively engage the downturned end portion 94 of the spring 90 and thus will positively hold the ball 84 in its sealing position against the seat 82, thus rendering the device substantially immune to vibration.

When the signal is removed from the coil 6 the spring 18 causes the control arm 14 to pivot in a clockwise direction. Immediately, by virtue of the frictional connection between the control arm 14 and the valve rod 86, that rod will be moved down, exposing the conduit 76 to the atmosphere. This will permit air to escape readily from the space between the piston 62 and the bottom cylinder wall 68 of the dashpot 58, so that there will be but minimal resistance to the downward movement of the piston 62. At the same time the projection 42 carried by the control arm 14 will press against the underside of the left-hand end of the timing arm 22 and force that timing arm 22 to pivot in a clockwise direction against the action of the spring 38, moving the magnet 54 away from the switch 44 and thus causing that switch to open and to deenergize the relay coil 97. Because the conduit 76 is open to the atmosphere, this resetting movement of the timing arm 22 is accomplished quite readily, and is entirely independent of the setting of the throttling valve 70.

Figure 6:
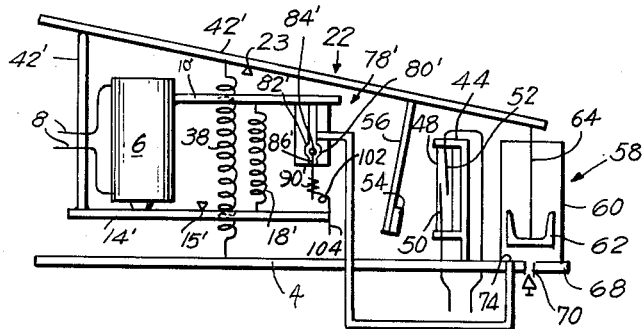
FIGS. 6 and 7 are schematic views of the embodiment of FIG. 5 showing the position of the parts respectively when a signal is being received and after the signal has stopped and the device has timed out.
Figure 7:
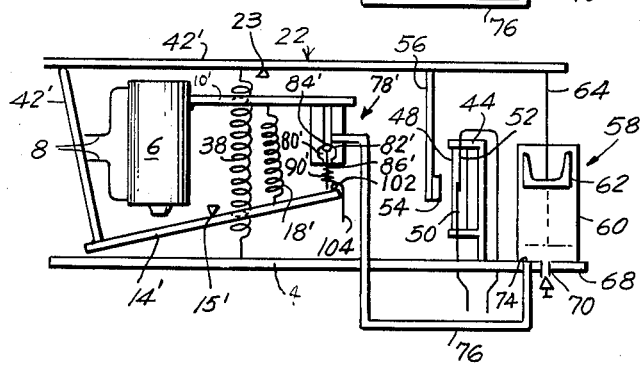

The embodiment of FIGS. 5–7 is generally similar to that of FIGS. 2–4, except that the embodiment of FIGS. 5–7 is specifically designed to provide a time delay upon deenergization of the coil 6. In this embodiment the timing arm 14' is mounted on the underside of the coil 6 and biasing spring 18 is connected between the right-hand end of the timing arm 14' and the plate 10', thereby biasing the control arm 14' to a counterclockwise rotation. The projection 42' extends up from the left-hand end of the timing arm 14' to the left of the coil 6, engaging the underside of the timing arm 22 as before. The valve 78' is supported in inverted position from the plate 10', with the valve rod 86' extending downwardly, and with its sealing seat 82' at the top of the chamber 80'. The coil spring 90' which is wrapped around the valve rod 86' so as to be in frictional connection therewith has a looped portion 102 which rests on the top of plate 88' and a downwardly extending end 104 which frictionally engages the edge of that plate. The other parts of the embodiment of FIGS. 5–7 are essentially the same as those in the embodiments of FIGS. 2–4 and similar reference numerals are applied thereto.

FIG. 6 illustrates the position of the parts of this second embodiment when the coil 6 is energized. The control arm 14' is attracted by the magnetic field emanating from the coil 6 and is pivoted in a clockwise direction against the action of the spring 18', its projection 42' engaging the timing arm 22 and moving it to its clockwise position against the action of the spring 38, the magnet 54 being moved away from the switch 44 so that said switch is in open condition, deenergizing the relay 96. The valve rod 86' is moved up, bringing the ball 84' into sealing engagement with the seat 82'. When the coil 6 is deenergized the control arm 14' is released and moves to its spring-biased position, pivoting counterclockwise. In so doing it releases the timing arm 22 for timing movement under the action of the spring 38 and also seals the conduit 76 from the atmosphere by moving the valve rod 86' upwardly until ball 84' seals seat 82', the throttling valve 70 thereafter controlling the speed of movement of the timing arm 22 in its counterclockwise rotation. Engagement of the plate 88' with the spring portion 102 ensures that the valve 78' remains closed. When the magnet 54 is brought close enough to the switch 44, that switch closes and the relay 96 is energized. When the coil 6 is again energized the control arm 14' is attracted thereby, pivots in a clockwise direction, engages and moves the timing arm 22 to its clockwise position, and opens the valve 78 by moving the valve rod 86' downwardly so as to permit relatively unrestricted movement of the dashpot piston 62 toward the dashpot end wall 68.

Highly accurate and sensitive magnetic switches 44 are readily available. Accordingly, the devices here described are capable of very precise action, and the timing may be very accurately controlled through the use of sturdy and reliable mechanical parts the operation of which is both position- and vibration-proof. Timing is substantially unaffected by temperature, and is completely unaffected by variations in signal strength, provided only that the signal has a predetermined minimal value. The simplicity and ruggedness of the instant invention go hand in hand with small size and low cost. Quick resetting is achieved entirely independently of the operative timing interval for which the device is adjusted. The power handling capacity of the unit is determined by the design of the relay 96, and this does not affect the sensitivity or accuracy of the timing operation.

In both of the embodiments specifically disclosed the switch 44 is normally open, and is closed at the end of the timing period, when the magnet 54 comes close enough. The opposite effect could easily be obtained, as by using a normally closed switch which opens when the magnet 54 approaches.

While but a limited number of embodiments are specifically disclosed, it will be apparent that many variations may be made therein, all within the scope of the invention as defined in the following claims.

I claim:

1. A time delay relay comprising a support, a timing arm on said support movable between first and second operative positions and biased toward the latter, an adjustable dashpot operatively connected to said timing arm, a magnetically sensitive switch on said support, a magnet operatively connected to said timing arm and movable thereby toward and away from said switch between switch-closing and switch-opening positions corresponding respectively to one and the other of said first and second operative positions of said timing arm, a control arm mounted on said support so as to be movable between first and second operative positions and biased toward the former, said control arm when in one of said positions engaging said timing arm and moving the latter to its first position and when in the other of said positions releasing said timing arm for movement of the latter to its second position, and an electromagnet operatively associated with said control arm and effective, when energized, to move said control arm to its second position.

2. The time delay relay of claim 1, in which said timing arm and said control arm are mounted on said support with said control arm and said electromagnet beneath said timing arm and with said control arm on the same side of said electromagnet as said timing arm.

3. The time delay relay of claim 1, in which said timing arm and said control arm are mounted on said support with said control arm and said electromagnet beneath said timing arm and with said control arm on the same side of said electromagnet as said timing arm, and with said switch, magnet and dashpot on the same side of said timing arm as said control arm.

4. The time delay relay of claim 1, in which said timing arm and said control arm are mounted on said support with said control arm and said electromagnet beneath said timing arm and with said control arm on the opposite side of said electromagnet from said timing arm.

5. The time delay relay of claim 1, in which said timing arm and said control arm are mounted on said support with said control arm and said electromagnet beneath said timing arm and with said control arm on the opposite side of said electromagnet from said timing arm and with said switch, magnet and dashpot on the same side of said timing arm as said control arm.

6. The time delay relay of claim 1, in which said timing arm and said control arm are each pivotally mounted on said support with said control arm and said electromagnet beneath said timing arm and with said control arm on the same side of said electromagnet as said timing arm.

7. The time delay relay of claim 1, in which said timing arm and said control arm are each pivotally mounted on said support with said control arm and said electromagnet beneath said timing arm and with said control arm on the same side of said electromagnet as said timing arm and with said switch, magnet and dashpot on the same side of said timing arm as said control arm.

8. The time delay relay of claim 1, in which said timing arm and said control arm are each pivotally mounted on said support with said control arm and said electromagnet beneath said timing arm and with said control arm on the opposite side of said electromagnet from said timing arm.

9. The time delay relay of claim 1, in which said timing arm and said control arm are each pivotally mounted on said support with said control arm and said electromagnet beneath said timing arm and with said control arm on the opposite side of said electromagnet from said timing arm and with said switch, magnet and dashpot on the same side of said timing arm as said control arm.

10. A time delay relay comprising a support, a timing arm on said support movable between first and second operative positions and biased toward the latter, an adjustable dashpot operatively connected to said timing arm, valve means operatively connected to said dashpot and shiftable between free-dashpot-movement and restrained-dashpot-movement conditions, a magnetically sensitive switch on said support, a magnet operatively connected to said timing arm and movable thereby toward and away from said switch between switch-closing and switch-opening positions corresponding respectively to one and the other of said first and second operative positions of said timing arm, a control arm mounted on said support so as to be movable between first and second operative positions and biased toward the former, said control arm when in one of said positions engaging said timing arm and moving the latter to its first position and when in the other of said positions releasing said timing arm for movement of the latter to its second position, an electromagnet operatively associated with said control arm and effective, when energized, to move said control arm to its second position, and an operative connection between said control arm and said valve means effective to shift said valve to restrained-dashpot-movement condition when said control arm moves out of said one of its operative positions and to shift said valve to free-dashpot-movement condition when said control arm moves out of the other of its operative positions.

11. The time delay relay of claim 10, in which said operative connection between said control arm and said valve comprises a frictional slip connection.

12. The time delay relay of claim 11, in which said timing arm and said control arm are mounted on said support with said control arm and said electromagnet beneath said timing arm and with said control arm on the same side of said electromagnet as said timing arm.

13. The time delay relay of claim 11, in which said timing arm and said control arm are mounted on said support with said control arm and said electromagnet beneath said timing arm and with said control arm on the same side of said electromagnet as said timing arm, and with said switch, magnet and dashpot on the same side of said timing arm as said control arm.

14. The time delay relay of claim 11, in which said timing arm and said control arm are mounted on said support with said control arm and said electromagnet beneath said timing arm and with said control arm on the opposite side of said electromagnet from said timing arm.

15. The time delay relay of claim 11, in which said timing arm and said control arm are mounted on said support with said control arm and said electromagnet beneath said timing arm and with said control arm on the opposite side of said electromagnet from said timing arm and with said switch, magnet and dashpot on the same side of said timing arm as said control arm.

16. The time delay relay of claim 11, in which said timing arm and said control arm are each pivotally mounted on said support with said control arm and said electromagnet beneath said timing arm and with said control arm on the same side of said electromagnet as said timing arm.

17. The time delay relay of claim 11, in which said timing arm and said control arm are each pivotally mounted on said support with said control arm and said electromagnet beneath said timing arm and with said control arm on the same side of said electromagnet as said timing arm and with said switch, magnet and dashpot on the same side of said timing arm as said control arm.

18. The time delay relay of claim 11, in which said timing arm and said control arm are each pivotally mounted on said support with said control arm and said electromagnet beneath said timing arm and with said control arm on the opposite side of said electromagnet from said timing arm.

19. The time delay relay of claim 11, in which said timing arm and said control arm are each pivotally mounted on said support with said control arm and said electromagnet beneath said timing arm and with said control arm on the opposite side of said electromagnet from said timing arm and with said switch, magnet and dashpot on the same side of said timing arm as said control arm.

20. A time delay relay comprising a support, a timing arm on said support movable between first and second operative positions and biased toward the latter, an adjustable dashpot operatively connected to said timing arm, valve means operatively connected to said dashpot and shiftable between free-dashpot-movement and restrained-dashpot-movement conditions, a magnetically sensitive switch on said support, a magnet operatively connected to said timing arm and movable thereby toward and away from said switch between switch-closing and switch-opening positions corresponding respectively to one and the other of said first and second operative positions of said timing arm, a control arm mounted on said support so as to be movable between first and second operative positions and biased toward the former, said control arm when in one of said positions engaging said timing arm and moving the latter to its first position and when in the other of said positions releasing said timing arm for movement of the latter to its second position, an electromagnet operatively associated with said control arm and effective, when energized, to move said control arm to its second position, and an operative connection between said control arm and said valve means effective to shift said valve to restrained-dashpot-movement condition when said control arm moves out of said one of its operative positions and to shift said valve to free-dashpot-movement condition when said control arm moves out of the other of its operative positions, said operative connection including means active on said valve, when said control arm is in said other of its operative positions, to positively retain said valve in said restrained-dashpot-movement condition.

No references cited.

BERNARD A. GILHEANY, *Primary Examiner.*